United States Patent
Zhao et al.

(10) Patent No.: US 12,554,651 B2
(45) Date of Patent: Feb. 17, 2026

(54) MEMORY PAGE MANAGEMENT METHOD, SYSTEM, AND APPARATUS, DEVICE, AND COMPUTER NON-VOLATILE READABLE STORAGE MEDIUM

(71) Applicant: IEIT SYSTEMS CO., LTD., Shandong (CN)

(72) Inventors: Yaqian Zhao, Shandong (CN); Fang Cao, Shandong (CN); Zhenhua Guo, Shandong (CN); Li Wang, Shandong (CN); Kai Gao, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 19/117,311

(22) PCT Filed: Jul. 26, 2024

(86) PCT No.: PCT/CN2024/107924
§ 371 (c)(1),
(2) Date: Mar. 31, 2025

(87) PCT Pub. No.: WO2025/021210
PCT Pub. Date: Jan. 30, 2025

(65) Prior Publication Data
US 2026/0010483 A1    Jan. 8, 2026

(30) Foreign Application Priority Data

Jul. 27, 2023 (CN) .......................... 202310928102.9

(51) Int. Cl.
*G06F 12/1009* (2016.01)
*G06F 12/02* (2006.01)
(Continued)

(52) U.S. Cl.
CPC ...... *G06F 12/1009* (2013.01); *G06F 12/0292* (2013.01); *G06F 12/0868* (2013.01); *G06F 12/1054* (2013.01)

(58) Field of Classification Search
CPC ............ G06F 12/1009; G06F 12/0292; G06F 12/0868; G06F 12/1054
See application file for complete search history.

(56) References Cited

U.S. PATENT DOCUMENTS

| | | |
|---|---|---|
| 8,543,792 B1 | 9/2013 | Glasco |
| 2007/0283124 A1 | 12/2007 | Menczak |

(Continued)

FOREIGN PATENT DOCUMENTS

| | | |
|---|---|---|
| CN | 106560798 A | 4/2017 |
| CN | 106843772 A | 6/2017 |

(Continued)

OTHER PUBLICATIONS

Chen, Yujie, "Hardware/Software Cooperative Caching for Hybrid DRAM-NVM Memory Architectures". Mar. 15, 2019 (Mar. 15, 2019).

(Continued)

*Primary Examiner* — Zhuo H Li
(74) *Attorney, Agent, or Firm* — Scully, Scott, Murphy & Presser, P.C.

(57) ABSTRACT

A memory page management method, system, and apparatus, a device, and a computer non-volatile readable storage medium are provided. The method includes acquiring a target virtual address of data to be accessed; performing a physical address lookup in a translation lookaside buffer based on the target virtual address; reading target data to be accessed from a physical address to be accessed if the corresponding physical address to be accessed is found in the translation lookaside buffer; and performing a parallel (Continued)

physical address lookup in a plurality of sets of uniformly addressed page tables based on the target virtual address if the physical address to be accessed is not found in the translation lookaside buffer, and reading the target data to be accessed from the physical address to be assessed if the physical address to be accessed is found.

20 Claims, 5 Drawing Sheets

(51) Int. Cl.
*G06F 12/0868* (2016.01)
*G06F 12/1045* (2016.01)

(56) References Cited

U.S. PATENT DOCUMENTS

| | | | | |
|---|---|---|---|---|
| 2014/0013074 | A1* | 1/2014 | Koka | G06F 12/1045 711/207 |
| 2023/0289295 | A1* | 9/2023 | Chen | G06F 12/1441 |
| 2025/0208996 | A1* | 6/2025 | Jin | G06F 13/161 |

FOREIGN PATENT DOCUMENTS

| | | |
|---|---|---|
| CN | 108804350 A | 11/2018 |
| CN | 109213694 A | 1/2019 |
| CN | 113868155 A | 12/2021 |
| CN | 114020655 A | 2/2022 |
| CN | 114153754 A | 3/2022 |
| CN | 114817081 A | 7/2022 |
| CN | 114840445 A | 8/2022 |
| CN | 115718620 A | 2/2023 |
| CN | 115794669 A | 3/2023 |
| CN | 115905036 A | 4/2023 |
| CN | 116383102 A | 7/2023 |
| CN | 116644006 A | 8/2023 |

OTHER PUBLICATIONS

Chen, Ji et al., "Largepages Supported Hierarchical DRAM/NVM Hybrid Memory Systems". Journal of Computer Research and Development. No. 9. Sep. 15, 2018 (Sep. 15, 2018), 55(9): pp. 2050-2065, DOI:10.7544/issn1000-1239.2018.20180269, with English Abstract.

Tan, Yujuan et al., "GATLB: A Granularity-Aware TLB to Support Multi-Granularity Pages in Hybrid Memory System". Design, Automation and Test in Europe Conference (DATE 2022), Jul. 15, 2022 (Jul. 15, 2022), pp. 909-914.

The first search report of CN application No. 202310928102.9 issued on Aug. 29, 2023.

The search report of PCT application No. PCT/CN2024/107924 issued on Sep. 29, 2024.

The first search report of CN application No. 202310928102.9 issued on Sep. 11, 2023.

The first office action of CN application No. 202310928102.9 issued on Aug. 31, 2023.

* cited by examiner

MEMORY PAGE MANAGEMENT METHOD, SYSTEM, AND APPARATUS, DEVICE, AND COMPUTER NON-VOLATILE READABLE STORAGE MEDIUM

CROSS-REFERENCE TO RELATED APPLICATION

This disclosure claims priority to Chinese Patent Application No. 202310928102.9, filed with the China National Intellectual Property Administration on Jul. 27, 2023 and entitled "MEMORY PAGE MANAGEMENT METHOD, SYSTEM, AND APPARATUS, DEVICE, AND COMPUTER MEDIUM", which is incorporated herein by reference in its entirety.

TECHNICAL FIELD

Embodiments of this disclosure relate to the technical field of memory management, and in particular, to a memory page management method, system, and apparatus, a device, and a computer non-volatile readable storage medium.

BACKGROUND

With the surge in the volume of data processed, the demand for a memory by computing engines has also grown dramatically. However, the growth rate of memory capacity lags behind the growth of processor performance. For example, while the number of processor cores doubles every two years, the memory capacity doubles every three years, which results in a 30% reduction in corresponding memory capacity per processor core within a single node every two years, exacerbating the scaling demand for increased storage-to-compute ratios in applications.

In summary, how to enhance the efficiency and performance of processor workloads is an urgent problem that those skilled in the art currently need to solve.

SUMMARY

An objective of an embodiment of this disclosure is to provide a memory page management method. Embodiments of this disclosure further provide a memory page management system and apparatus, an electronic device, and a computer non-volatile readable storage medium.

According to a first aspect of the embodiments of this disclosure, a memory page management method is provided, and applied to a target processor in a target node, and includes:
  a target virtual address of data to be accessed is acquired;
  a physical address lookup is performed in a translation lookaside buffer based on the target virtual address, the translation lookaside buffer storing mapping relationships between target physical addresses in a local memory and other memories and corresponding virtual addresses;
  target data to be accessed is read from a physical address to be accessed if the physical address to be accessed, corresponding to the target virtual address, is found in the translation lookaside buffer; and
  a parallel physical address lookup is performed in a local memory page table and other memory page tables based on the target virtual address if the physical address to be accessed is not found in the translation lookaside buffer, and reading the target data to be accessed from the physical address to be assessed if the physical address to be accessed is found,
  where the local memory page table includes page tables that store mapping relationships between physical addresses in the local memory and corresponding virtual addresses; the other memory page tables include page tables that store mapping relationships between physical addresses in the other memories and corresponding virtual addresses; and the local memory includes a memory connected with the target processor in the target node, while the other memories include memories connected with the target processor in other nodes except the target node.

In some embodiments, the method further includes:
the local memory is acquired;
the other memories are acquired; and
the local memory and the other memories are uniformly addressed to obtain physical addresses of the memories, in order to screen out physical addresses where first popularity data is stored in the local memory and the other memories as the target physical addresses, the popularity data including data that meets hot access conditions, generating the translation lookaside buffer based on the target physical addresses and corresponding virtual addresses, generating the local memory page table based on other physical addresses in the local memory except the target physical addresses and corresponding virtual addresses, and generating the other memory page tables based on other physical addresses in the other memories except the target physical addresses and corresponding virtual addresses.

In some embodiments, the method further includes:
the monitoring of usage popularity on a last level cache, the translation lookaside buffer, the local memory page table, and the other memory page tables is conducted based on a first kernel thread, to obtain a page usage cold/hot map, cold pages in the page usage cold/hot map storing mapping relationships between virtual addresses and physical addresses with the usage popularity lower than a set value, and hot pages in the page usage cold/hot map storing mapping relationships between virtual addresses and physical addresses with the usage popularity higher than the set value; and
data corresponding to the cold pages, according to the page usage cold/hot map, is transferred from the local memory to the other memories based on a second kernel thread, data corresponding to the hot pages is transferred from the other memories to the local memory based on the second kernel thread, the mapping relationships in the translation lookaside buffer, the local memory page table, and the other memory page tables are updated,
where the last level cache stores second popularity data with the popularity higher than that of the first popularity data.

In some embodiments, the local memory and the other memories are all composed of a dynamic random access memory and a persistent memory.

In some embodiments, data corresponding to the cold pages is transferred from the local memory to the other memories based on the second kernel thread includes:
  the data corresponding to the cold pages is transferred from the local memory to the persistent memories in the other memories based on the second kernel thread if the persistent memories in the other memories are not full; and the data corresponding to the cold pages is transferred from the local memory to the dynamic random access memories in the other memories based on the second kernel thread if the persistent memories in the other memories are full.

In some embodiments, data corresponding to the hot pages is transferred from the other memories to the local memory based on the second kernel thread includes:

the data corresponding to the hot pages is transferred from the other memories to the dynamic random access memory in the local memory based on the second kernel thread if the dynamic random access memory in the local memory is not full; and the data corresponding to the hot pages is transferred from the other memories to the persistent memory in the local memory based on the second kernel thread if the dynamic random access memory in the local memory is full.

In some embodiments, before the physical address lookup is performed in a translation lookaside buffer based on the target virtual address, the method further includes:

a data lookup is performed in the last level cache based on the target virtual address;

the lookup is ended if the target data is found in the last level cache; and the step of performing a physical address lookup in a translation lookaside buffer based on the target virtual address is performed if no target data is found in the last level cache.

In some embodiments, uniformly addressing the local memory and the other memories includes:

uniform addressing is performed on the local memory and the other memories using rack base addresses, node base addresses, and node internal hardware addresses, and the rack base addresses include base addresses of racks where nodes are located.

In some embodiments, the other memories include first-level memories and second-level memories, and the distance between the first-level memories and the target processor is smaller than the distance between the second-level memories and the target processor.

In some embodiments, the target processor and the local memory are connected through a memory bus.

In some embodiments, the target processor and the first-level memories are connected through a coherent interconnect protocol.

In some embodiments, the target processor and the second-level memories are connected through an autonomous high-speed coherent network protocol.

In some embodiments, the first-level memories include memories in the other nodes located on the same rack as the target node.

In some embodiments, the first-level memories include at least two memories.

In some embodiments, the second-level memories include memories in the other nodes on different racks from the target node.

In some embodiments, the second-level memories include memories in at least two of the other nodes on the same rack.

In some embodiments, the second-level memories include memories in at least two of the other nodes on different racks.

In some embodiments, transferring data corresponding to the cold pages from the local memory to the other memories based on the second kernel thread includes:

the data corresponding to the cold pages is transferred from the local memory to the first-level memories based on the second kernel thread if the first-level memories are not full; and the data corresponding to the cold pages is transferred from the local memory to the second-level memories based on the second kernel thread if the first-level memories are full.

According to a second aspect of the embodiments of this disclosure, a memory page management apparatus is provided, and applied to a target processor in a target node, and includes:

a first acquiring module, configured to acquire a target virtual address of data to be accessed;

a first lookup module, configured to perform a physical address lookup in a translation lookaside buffer based on the target virtual address, the translation lookaside buffer storing mapping relationships between target physical addresses in a local memory and other memories and corresponding virtual addresses;

a first read module, configured to read target data to be accessed from a physical address to be accessed if the physical address to be accessed, corresponding to the target virtual address, is found in the translation lookaside buffer; and a second lookup module, configured to perform a parallel physical address lookup in a local memory page table and other memory page tables based on the target virtual address if the physical address to be accessed is not found in the translation lookaside buffer, and read the target data to be accessed from the physical address to be assessed if the physical address to be accessed is found, where the local memory page table includes page tables that store mapping relationships between physical addresses in the local memory and corresponding virtual addresses; the other memory page tables include page tables that store mapping relationships between physical addresses in the other memories and corresponding virtual addresses; and the local memory includes a memory connected with the target processor in the target node, while the other memories include memories connected with the target processor in other nodes except the target node.

According to a third aspect of the embodiments of this disclosure, a memory page management system is provided and includes at least two racks. Each rack includes at least two target nodes. Each target node includes a target processor and a memory, where the target processor of the target node is connected with the memory of at least one other target node located on the same rack and the memory of at least one target node located on different racks.

The target processor is configured to acquire a target virtual address of data to be accessed; perform a physical address lookup in a translation lookaside buffer based on the target virtual address, where the translation lookaside buffer stores mapping relationships between target physical addresses in a local memory and other memories and corresponding virtual addresses; read target data to be accessed from a physical address to be accessed if the physical address to be accessed, corresponding to the target virtual address, is found in the translation lookaside buffer; and perform a parallel physical address lookup in a local memory page table and other memory page tables based on the target virtual address if the physical address to be accessed is not found in the translation lookaside buffer, and read the target data to be accessed from the physical address to be assessed if the physical address to be accessed is found, where the local memory page table includes page tables that store mapping relationships between physical addresses in the local memory and corresponding virtual addresses; the other memory page tables include page tables that store mapping relationships between physical addresses in the other memories and corresponding virtual addresses; and the local memory includes a memory connected with the target processor in the target node, while the other memories include memories connected with the target processor in other nodes except the target node.

According to a fourth aspect of the embodiments of this disclosure, an electronic device is provided, and includes:
 a memory, configured to store a computer program; and
 a processor, configured to implement, when executing the computer program, the steps of any one of the above memory page management methods.

According to a fifth aspect of the embodiments of this disclosure, a computer non-volatile readable storage medium is provided, and has a computer program stored therein. The computer program, when executed by a processor, implements the steps of any one of the above memory page management methods.

BRIEF DESCRIPTION OF THE DRAWINGS

In order to describe technical solutions in embodiments of this disclosure or in the prior art more clearly, accompanying drawings required to be used in descriptions of the embodiments or the prior art will be briefly introduced below, it is apparent that the accompanying drawings described below are only some embodiments of this disclosure, and those of ordinary skill in the art may also obtain other accompanying drawings according to these accompanying drawings without creative efforts.

DETAILED DESCRIPTION OF THE EMBODIMENTS

Technical solutions in embodiments of this disclosure are clearly and completely described below in combination with accompanying drawings in the embodiments of this disclosure, and it is apparent that the described embodiments are only a part rather all of the embodiments of this disclosure. All other embodiments obtained by those of ordinary skill in the art based on the embodiments of this disclosure without creative efforts shall fall within the scope of projection of the embodiments of this disclosure.

Figure 1:
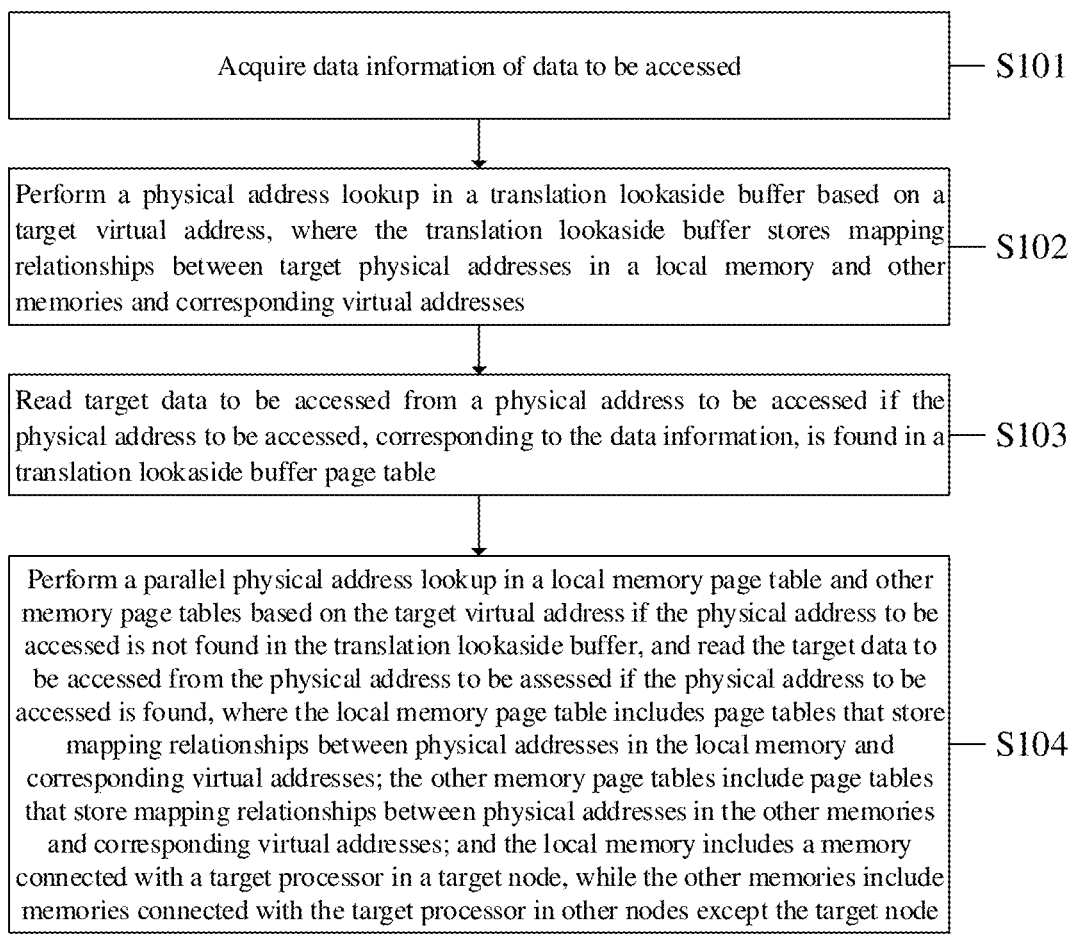
FIG. 1 is a first schematic diagram of a memory page management method according to an embodiment of this disclosure.

Referring to FIG. 1, FIG. 1 is a first schematic diagram of a memory page management method according to an embodiment of this disclosure.

The memory page management method according to this embodiment of this disclosure is applied to a target processor in a target node, and may include the following steps:

Step S101: A target virtual address of data to be accessed is acquired.

In practical applications, the target processor may first acquire the target virtual address of the data to be accessed, so as to subsequently read corresponding target data from a memory according to the target virtual address.

In a practical application scenario, the target virtual address acquired by the target processor may be a virtual address of data that needs to be searched for, determined under a user operation after an application program in the target node is launched, etc. This embodiment of this disclosure does not impose limitations in this regard. It should be noted that the target processor in this embodiment of this disclosure refers to a processor that runs the method in this embodiment of this disclosure, and the target node refers to a node where the target processor is located.

Step S102: A physical address lookup is performed in a translation lookaside buffer based on the target virtual address, the translation lookaside buffer storing mapping relationships between target physical addresses in a local memory and other memories and corresponding virtual addresses.

In practical applications, after the target processor acquires the target virtual address of the data to be accessed, the physical address lookup may be performed in the translation lookaside buffer (TLB) based on the target virtual address, and the translation lookaside buffer stores the mapping relationships between the target physical addresses in the local memory and the other memories and the corresponding virtual addresses. That is, in this embodiment of this disclosure, the mapping relationships between the target physical addresses in the local memory and the other memories and the corresponding virtual addresses are stored in the translation lookaside buffer to be managed, and during the data lookup, the translation lookaside buffer is preferably used for the lookup, thereby rapidly acquiring corresponding data from the target physical address.

It should be noted that a physical address of data is used for managing the data at a memory level, while a virtual address of the data is used for managing the data outside the memory, such as at an operating level. That is, each piece of data has both a virtual address and a physical address, and the virtual address and the physical address of the data are in one-to-one correspondence. Therefore, when searching for the data in the memory, the physical address of the data in the memory needs to be first determined based on the virtual address of the data, and then the corresponding data is read from the physical address in the memory.

Step S103: Target data to be accessed is read from a physical address to be accessed if the physical address to be accessed, corresponding to the target virtual address, is found in the translation lookaside buffer.

Step S104: A parallel physical address lookup is performed in a local memory page table and other memory page tables based on the target virtual address if the physical address to be accessed is not found in the translation lookaside buffer, and read the target data to be accessed from the physical address to be assessed if the physical address to be accessed is found, where the local memory page table includes page tables that store mapping relationships between physical addresses in the local memory and corresponding virtual addresses; the other memory page tables include page tables that store mapping relationships between physical addresses in the other memories and corresponding virtual addresses; and the local memory includes a memory connected with the target processor in the target node, while the other memories include memories connected with the target processor in other nodes except the target node.

In practical applications, if the target processor searches the translation lookaside buffer for the physical address to be accessed that corresponds to the target virtual address, the target data to be accessed is read from the memory corresponding to the physical address to be accessed for feedback, such as feedback to the application program. Correspondingly, if the target processor searches the translation lookaside buffer for no physical address to be accessed, the parallel physical address lookup is performed in the local memory page table and the other memory page tables based on the target virtual address, and if the physical address to be accessed is found, the target data to be accessed is read from the physical address to be accessed for feedback. Moreover, the local memory page table includes the page tables that store the mapping relationships between the physical addresses in the local memory and the corresponding virtual addresses, the other memory page tables include the page tables that store the mapping relationships between the physical addresses in the other memories and the corresponding virtual addresses, and therefore if the target processor finds the address to be accessed in the local memory page table, the target data may be read from the address to be accessed in the local memory, and if the address to be accessed is found in the other memory page tables, the target data may be read from the address to be accessed in the other memories.

It should be noted that a memory located in the same node as the target processor is referred to as the local memory, while the other memories refer to memories in the other nodes except the target node. In other words, the memories connected with the target processor in the other nodes are referred to as the other memories. The size, type, etc., of the local memory and the other memories may be determined according to application scenarios, and this embodiment of this disclosure does not impose limitations in this regard.

The memory page management method provided in this embodiment of this disclosure is applied to the target processor in the target node, and includes: acquiring the target virtual address of the data to be accessed; performing the physical address lookup in the translation lookaside buffer based on the target virtual address, where the translation lookaside buffer stores the mapping relationships between the target physical addresses in the local memory and the other memories and the corresponding virtual addresses; reading the target data to be accessed from the physical address to be accessed if the physical address to be accessed, corresponding to the target virtual address, is found in the translation lookaside buffer; and performing the parallel physical address lookup in the local memory page table and the other memory page tables based on the target virtual address if the physical address to be accessed is not found in the translation lookaside buffer, and reading the target data to be accessed from the physical address to be assessed if the physical address to be accessed is found, where the local memory page table includes the page tables that store the mapping relationships between the physical addresses in the local memory and the corresponding virtual addresses; the other memory page tables include the page tables that store the mapping relationships between the physical addresses in the other memories and the corresponding virtual addresses; and the local memory includes the memory connected with the target processor in the target node, while the other memories include the memories connected with the target processor in the other nodes except the target node. In this embodiment of this disclosure, the target processor is connected with the local memory and the other memories, which is equivalent to expanding the capacity of the memory connected by the target processor, so that the memory may be matched with performance of the target processor. By uniformly managing the physical addresses of the local memory and the other memories through the translation lookaside buffer, the local memory page table, and the other memory page tables, the problem of address mapping overhead caused by large-scale hybrid memory pooling is avoided. In addition, after expanding the available memory of the target processor through the other memories, the translation lookaside buffer may be applied to preferably perform a rapid lookup on data stored at the target physical addresses in the local memory and the other memories, and the local memory page table and the other memory page tables may be applied to accurately search for the data in the local memory and the other memories. By using the translation lookaside buffer, the local memory page table, and the other memory page tables, rapid and accurate data management on the local memory and the other memories is achieved, and the efficiency and the performance of the processor workloads are improved.

Figure 2:
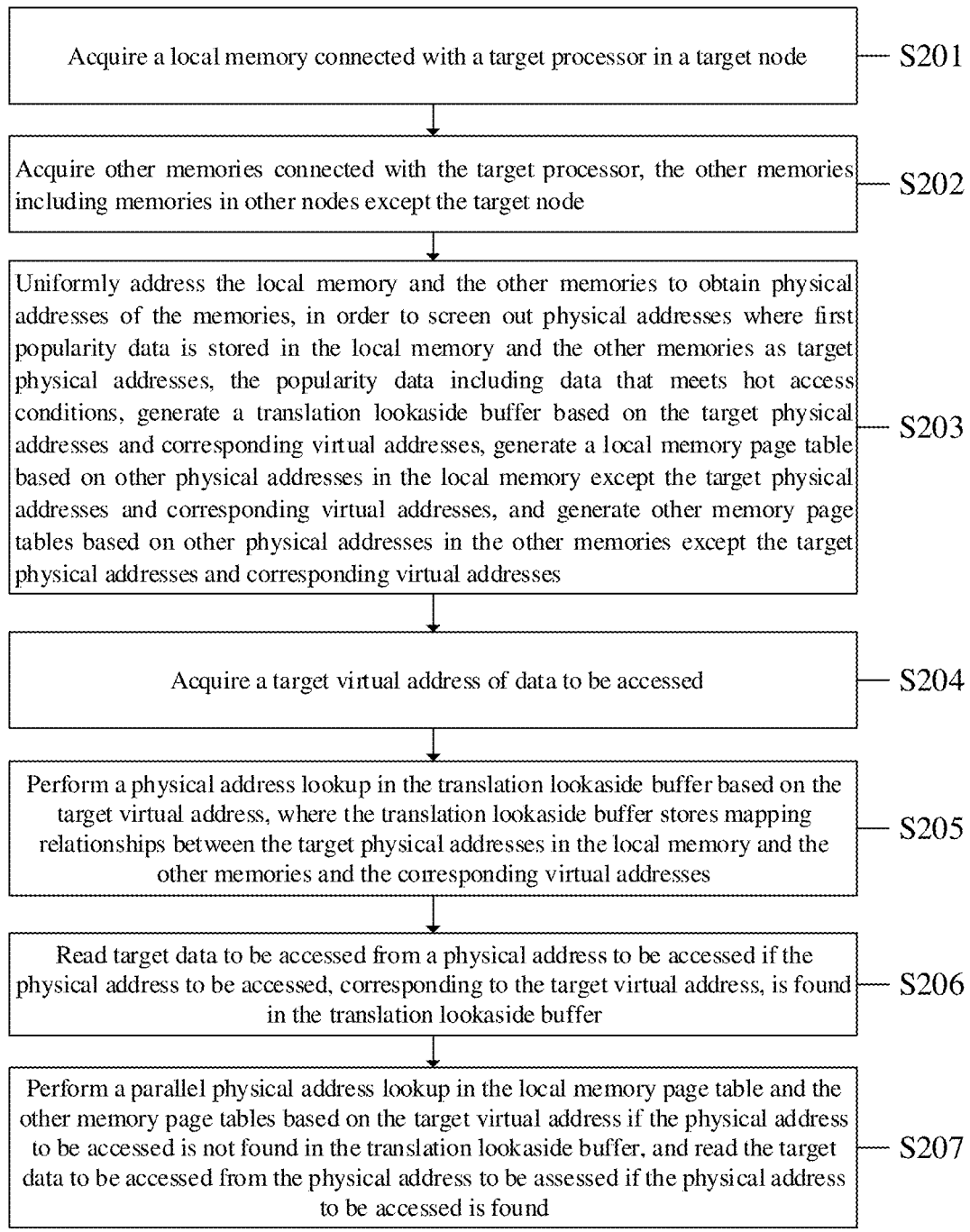
FIG. 2 is a second schematic diagram of a memory page management method according to an embodiment of this disclosure.

Referring to FIG. 2, FIG. 2 is a second schematic diagram of a memory page management method according to an embodiment of this disclosure. The memory page management method according to this embodiment of this disclosure is applied to a target processor in a target node, and may include the following steps:

Step S201: A local memory connected with the target processor in the target node is acquired.

Step S202: Other memories connected with the target processor are acquired, where the other memories include memories in other nodes except the target node.

Step S203: The local memory and the other memories are uniformly addressed to obtain physical addresses of the memories, in order to screen out physical addresses where first popularity data is stored in the local memory and the other memories as target physical addresses, the popularity data including data that meets hot access conditions, generate a translation lookaside buffer based on the target physical addresses and corresponding virtual addresses, generate a local memory page table based on other physical addresses in the local memory except the target physical addresses and corresponding virtual addresses, and generate other memory page tables based on other physical addresses in the other memories except the target physical addresses and corresponding virtual addresses.

In practical applications, after acquiring the local memory and the other memories, the target processor may perform the uniform addressing on the local memory and the other memories to obtain the physical addresses of the memories, so that the target processor may accurately manage and control each memory, and an operating system and other applications generate the corresponding translation lookaside buffer, the corresponding memory page table, and the corresponding other memory page tables according to the physical addresses.

In practical application scenarios, in the process of the uniform addressing of the local memory and the other memories, the uniform addressing may be performed using rack base addresses, node base addresses, and node internal hardware addresses, as well as using a tree structure. The rack base addresses include base addresses of racks where nodes are located. For example, a rack address+a node address+a node internal hardware address may be used as a physical address of a memory. In practical applications, a virtual root node may also be introduced to expand the physical address, such as using the virtual root node+the rack address+the node address+the node internal hardware address as the physical address of the memory, where the rack address may be a unique identifier for a rack, the node address may be a unique identifier for a node, and the virtual root node may be a unique identifier for an independent rack system.

In practical applications, after the target processor obtains the physical addresses of the memories, the operating system, etc. may apply the physical addresses of the memories to perform data management on the memories. In the process, considering that the memories have the popularity data stored therein, the popularity data is data that meets the hot access conditions such as an access frequency and an access count being greater than set values. To rapidly perform accurate management on the popularity data and other data and achieve accurate management on the data in the local memory and the other memories, the operating system, etc. may screen out the physical addresses in the local memory and the other memories that store the first popularity data as the target virtual addresses, and the mapping relationships between the target physical addresses and the corresponding virtual addresses are stored in the translation lookaside buffer. The mapping relationships between the other physical addresses in the local memory except the target physical addresses and the corresponding virtual addresses are stored in the local memory page table. The mapping relationships between the other physical addresses in the other memories except the target physical addresses and the corresponding virtual addresses are stored in the other memory page tables. Certainly, the mapping relationships between all the physical addresses in the local memory and the corresponding virtual addresses may also be stored in the local memory page table, and the mapping relationships between all the physical addresses in the other memory page tables and the corresponding virtual addresses are stored in the other memory page tables, and therefore memory page management is performed based on the translation lookaside buffer, the local memory page table, and the other memory page tables.

In practical applications, to accelerate the efficiency of the target processor in searching for the target data, before screening out the physical addresses in the local memory and the other memories that store the first popularity data as the target physical addresses, the operating system, etc. may also screen out second popularity data stored in the local memory and the other memories. The popularity of the second popularity data is higher than that of the first popularity data. The second popularity data is directly stored in a last level cache (LLC), thereby performing data access processing based on the last level cache. Correspondingly, before the step of performing a physical address lookup in a translation lookaside buffer based on the target virtual address, the target processor may also first perform the data lookup in the last level cache based on the target virtual address; the lookup is ended if the target data is found in the last level cache; and the step of performing a physical address lookup in a translation lookaside buffer based on the target virtual address is performed if no target data is found in the last level cache.

In practical applications, as the number of memory accesses increases, some data are accessed multiple times while some other data are rarely accessed. Limited by access speeds of the local memory and the other memories, speeds that the target processor reads the data from the local memory and the other memories are inconsistent. Some application scenarios require the target processor to quickly feed back the data from the memories. To meet such application requirements and improve the efficiency of memory access and storage by the target processor, considering that the access speed to the local memory is superior to that of the other memories by the target processor, the target processor may monitor usage popularity on the last level cache, the translation lookaside buffer, the local memory page table, and the other memory page tables based on a first kernel thread, to obtain a page usage cold/hot map. Cold pages in the page usage cold/hot map store mapping relationships between virtual addresses and physical addresses with the usage popularity lower than a set value. Hot pages in the page usage cold/hot map store mapping relationships between virtual addresses and physical addresses with the usage popularity higher than the set value. In other words, the cold pages are used to store the mapping relationships between the virtual addresses and the physical addresses of cold data, while the hot pages are used to store the mapping relationships between the virtual addresses and the physical addresses of hot data. According to the page usage cold/hot map, data corresponding to the cold pages from the local memory is transferred to the other memories based on a second kernel thread, and data corresponding to the hot pages from the other memories is transferred to the local memory based on the second kernel thread. The mapping relationships in the translation lookaside buffer, the local memory page table, and the other memory page tables are updated.

Optionally, the cold data at the physical addresses recorded in the cold pages from the local memory may be transferred to the other memories based on the second kernel thread, and the mapping relationships between the virtual addresses of the cold data and old physical addresses are deleted in the local memory page table. Mapping relationships between the virtual addresses of the cold data and the latest physical addresses are newly added in the other memory page tables. If the cold data is previously in the translation lookaside buffer, the mapping relationships between the virtual addresses of the cold data and the old physical addresses need to be deleted from the translation lookaside buffer. The hot data at the physical addresses recorded in the hot pages in the other memories is transferred to the other memories based on the second kernel thread, and the mapping relationships between the virtual addresses of the hot data and the old physical addresses are deleted from the other memory page tables. Mapping relationships between the virtual addresses of the hot data and the latest physical addresses are newly added in the local memory page table. If the hot data is previously in the translation lookaside buffer, the mapping relationships between the virtual addresses of the hot data and the latest physical addresses need to be updated in the translation lookaside buffer. The old physical addresses refer to physical addresses before data transfer, and the latest physical addresses refer to physical addresses after the data transfer.

In practical application scenarios, the type of the local memory and the other memories may be determined according to actual needs. For example, the local memory and the other memories may all be composed of a dynamic random access memory (DRAM) and a persistent memory (PM).

In practical application scenarios, considering that the performance of the dynamic random access memory is superior to that of the persistent memory, when the target processor transfers the data corresponding to the cold pages from the local memory to the other memories based on the second kernel thread, if the persistent memories in the other memories are not full, the data corresponding to the cold pages from the local memory may be transferred to the persistent memories of the other memories based on the second kernel thread. If the persistent memories in the other memories are full, the data corresponding to the cold pages from the local memory is transferred to the dynamic random access memories of the other memories based on the second kernel thread. Correspondingly, when the data corresponding to the hot pages from the other memories is transferred to the local memory based on the second kernel thread, if the dynamic random access memory in the local memory is not full, the data corresponding to the hot pages from the other memories may be transferred to the dynamic random access memory in the local memory based on the second kernel thread; and if the dynamic random access memory in the local memory is full, the data corresponding to the hot pages from the other memories is transferred to the persistent memory in the local memory based on the second kernel thread. Therefore, the target processor may preferably read frequently used hot pages from the dynamic random access memory in the local memory. Since memory data corresponding to the physical addresses in the hot pages is the hot data, the target processor may acquire the recorded hot data by preferably acquiring the hot pages, thereby improving the efficiency of acquiring the hot data.

In practical application scenarios, the data corresponding to the hot pages stored in the persistent memory in the local memory may also be transferred to the dynamic random access memory in the local memory, and the data corresponding to the cold pages stored in the dynamic random access memories in the other memories is transferred to the persistent memories in the other memories, thereby accelerating the efficiency of access to the target data by the target processor.

In practical applications, the type of the other memories may be determined according to actual needs. For example, the other memories may be classified according to distances between the memories and the target processor. Correspondingly, when the target processor acquires the other memories connected with the target processor, the other memories connected with the target processor may be acquired. The other memories include first-level memories and second-level memories. The distance between the first-level memories and the target processor is smaller than the distance between the second-level memories and the target processor.

In practical application scenarios, to facilitate the communication between the target processor and the memories, the target processor and the local memory may be connected through a memory bus. The target processor and the first-level memories may be connected through a coherent interconnect protocol. The target processor and the second-level memories may be connected through an autonomous high-speed coherent network protocol.

In practical application scenarios, to facilitate the acquisition of the first-level memories, the first-level memories may be set as memories in other nodes located on the same rack as the target node, and the first-level memories may include at least two memories.

In practical application scenarios, to facilitate the acquisition of the second-level memories, the second-level memories may be set as memories in other nodes located on different racks from the target node. The second-level memories may include memories in at least two of the other nodes on the same rack, or may include memories in at least two of the other nodes on different racks.

In practical application scenarios, when the target processor transfers the data corresponding to the cold pages from the local memory to the other memories based on the second kernel thread, the data corresponding to the cold pages may be preferably transferred to the first-level memories. That is, if the first-level memories are not full, the data corresponding to the cold pages from the local memory is transferred to the first-level memories based on the second kernel thread. If the first-level memories are full, the data corresponding to the cold pages from the local memory is transferred to the second-level memories based on the second kernel thread.

Step S204: A target virtual address of data to be accessed is acquired.

Step S205: A physical address lookup is performed in the translation lookaside buffer based on the target virtual address, where the translation lookaside buffer stores mapping relationships between the target physical addresses in the local memory and the other memories and the corresponding virtual addresses.

Step S206: Target data to be accessed is read from a physical address to be accessed if the physical address to be accessed, corresponding to the target virtual address, is found in the translation lookaside buffer.

It should be noted that since the target physical address is a physical address where the first popularity data is stored, in this embodiment, the target processor preferably finds the popularity data in the local memory and the other memories from the translation lookaside buffer. In other words, the type of the data stored at the target physical address decides the type of data that the target processor prioritizes finding in the local memory and the other memories.

Step S207: A parallel physical address lookup is performed in the local memory page table and the other memory page tables based on the target virtual address if the physical address to be accessed is not found in the translation lookaside buffer, and read the target data to be accessed from the physical address to be assessed if the physical address to be accessed is found.

Figure 3:
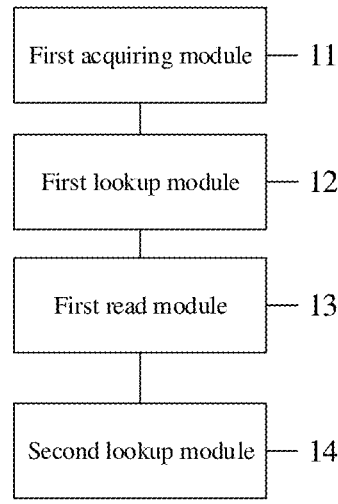
FIG. 3 is a schematic diagram of a structure of a memory page management apparatus according to an embodiment of this disclosure.

Referring to FIG. 3, FIG. 3 is a schematic diagram of a structure of a memory page management apparatus according to an embodiment of this disclosure.

The memory page management apparatus according to this embodiment of this disclosure is applied to a target processor in a target node, and may include:

a first acquiring module 11, configured to acquire a target virtual address of data to be accessed;

a first lookup module 12, configured to perform a physical address lookup in a translation lookaside buffer based on the target virtual address, the translation lookaside buffer storing mapping relationships between target physical addresses in a local memory and other memories and corresponding virtual addresses;

a first read module 13, configured to read target data to be accessed from a physical address to be accessed if the physical address to be accessed, corresponding to the target virtual address, is found in the translation lookaside buffer; and a second lookup module 14, configured to perform a parallel physical address lookup in a local memory page table and other memory page tables based on the target virtual address if the physical address to be accessed is not found in the translation lookaside buffer, and read the target data to be accessed from the physical address to be assessed if the physical address to be accessed is found, where the local memory page table includes page tables that store mapping relationships between physical addresses in a local memory and corresponding virtual addresses; the other memory page tables include page tables that store mapping relationships between physical addresses in other memories and corresponding virtual addresses; and the local memory includes a memory connected with the target processor in the target node, while the other memories include memories connected with the target processor in other nodes except the target node.

The memory page management apparatus according to this embodiment of this disclosure is applied to the target processor in the target node, and may also include:

a second acquiring module, configured to acquire the local memory before the first acquiring module acquires the target virtual address of the data to be accessed;

a third acquiring module, configured to acquire the other memories; and an addressing module, configured to uniformly address the local memory and the other memories to obtain physical addresses of the memories, in order to screen out physical addresses where first popularity data is stored in the local memory and the other memories as target physical addresses, the popularity data including data that meets hot access conditions, generate the translation lookaside buffer based on the target physical addresses and corresponding virtual addresses, generate a local memory page table based on other physical addresses in the local memory except the target physical addresses and corresponding virtual addresses, and generate other memory page tables based on other physical addresses in the other memories except the target physical addresses and corresponding virtual addresses.

The memory page management apparatus according to this embodiment of this disclosure is applied to the target processor in the target node, and may also include:

a monitoring module, configured to monitor usage popularity on a last level cache, the translation lookaside buffer, the local memory page table, and the other memory page tables based on a first kernel thread, to obtain a page usage cold/hot map, where cold pages in the page usage cold/hot map store mapping relationships between virtual addresses and physical addresses with the usage popularity lower than a set value, and hot pages in the page usage cold/hot map store mapping relationships between virtual addresses and physical addresses with the usage popularity higher than the set value; and a transfer module, configured to transfer, according to the page usage cold/hot map, data corresponding to the cold pages from the local memory to the other memories based on a second kernel thread, transfer data corresponding to the hot pages from the other memories to the local memory based on the second kernel thread, and update the mapping relationships in the translation lookaside buffer, the local memory page table, and the other memory page tables, where the last level cache stores second popularity data with the popularity higher than that of the first popularity data.

The memory page management apparatus according to this embodiment of this disclosure is applied to the target processor in the target node. The local memory and the other memories are all composed of a dynamic random access memory and a persistent memory.

The memory page management apparatus according to this embodiment of this disclosure is applied to the target processor in the target node. The transfer module is configured to: transfer data corresponding to the cold pages from the local memory to the persistent memories in the other memories based on the second kernel thread if the persistent memories in the other memories are not full, and transfer data corresponding to the cold pages from the local memory to the dynamic random access memories in the other memories based on the second kernel thread if the persistent memories in the other memories are full.

The memory page management apparatus according to this embodiment of this disclosure is applied to the target processor in the target node. The transfer module is configured to: transfer the data corresponding to the hot pages from the other memories to the dynamic random access memory in the local memory based on the second kernel thread if the dynamic random access memory in the local memory is not full, and transfer the data corresponding to the hot pages from the other memories to the persistent memory in the local memory based on the second kernel thread if the dynamic random access memory in the local memory is full.

The memory page management apparatus according to this embodiment of this disclosure is applied to the target processor in the target node, and may also include:

a third lookup module, configured to perform a data lookup in the last level cache based on the target virtual address before the first lookup module performs the physical address lookup in the translation lookaside buffer based on the target virtual address, end the lookup if the target data is found in the last level cache, and prompt a management module to perform the step of performing the physical address lookup in the translation lookaside buffer based on the target virtual address if no target data is found in the last level cache.

The memory page management apparatus according to this embodiment of this disclosure is applied to the target processor in the target node. The addressing module is configured to: perform uniform addressing on the local memory and the other memories using rack base addresses, node base addresses, and node internal hardware addresses, where the rack base addresses include base addresses of racks where nodes are located.

The memory page management apparatus according to this embodiment of this disclosure is applied to the target processor in the target node. The other memories include first-level memories and second-level memories. The distance between the first-level memories and the target processor is smaller than the distance between the second-level memories and the target processor.

The memory page management apparatus according to this embodiment of this disclosure is applied to the target processor in the target node. The target processor and the local memory are connected through a memory bus.

The memory page management apparatus according to this embodiment of this disclosure is applied to the target processor in the target node. The target processor and the first-level memories are connected through a coherent interconnect protocol.

The memory page management apparatus according to this embodiment of this disclosure is applied to the target processor in the target node. The target processor and the second-level memories are connected through an autonomous high-speed coherent network protocol.

The memory page management apparatus according to this embodiment of this disclosure is applied to the target processor in the target node. The first-level memories include memories in other nodes located on the same rack as the target node.

The memory page management apparatus according to this embodiment of this disclosure is applied to the target processor in the target node. The first-level memories include at least two memories.

The memory page management apparatus according to this embodiment of this disclosure is applied to the target processor in the target node. The second-level memories include memories in other nodes on different racks from the target node.

The memory page management apparatus according to this embodiment of this disclosure is applied to the target processor in the target node. The second-level memories include memories in at least two of the other nodes on the same rack.

The memory page management apparatus according to this embodiment of this disclosure is applied to the target processor in the target node. The second-level memories include memories in at least two of the other nodes on different racks.

The memory page management apparatus according to this embodiment of this disclosure is applied to the target processor in the target node. The transfer module is configured to: transfer the data corresponding to the cold pages from the local memory to the first-level memories based on the second kernel thread if the first-level memories are not full, and transfer the data corresponding to the cold pages from the local memory to the second-level memories based on the second kernel thread if the first-level memories are full.

Figure 4:
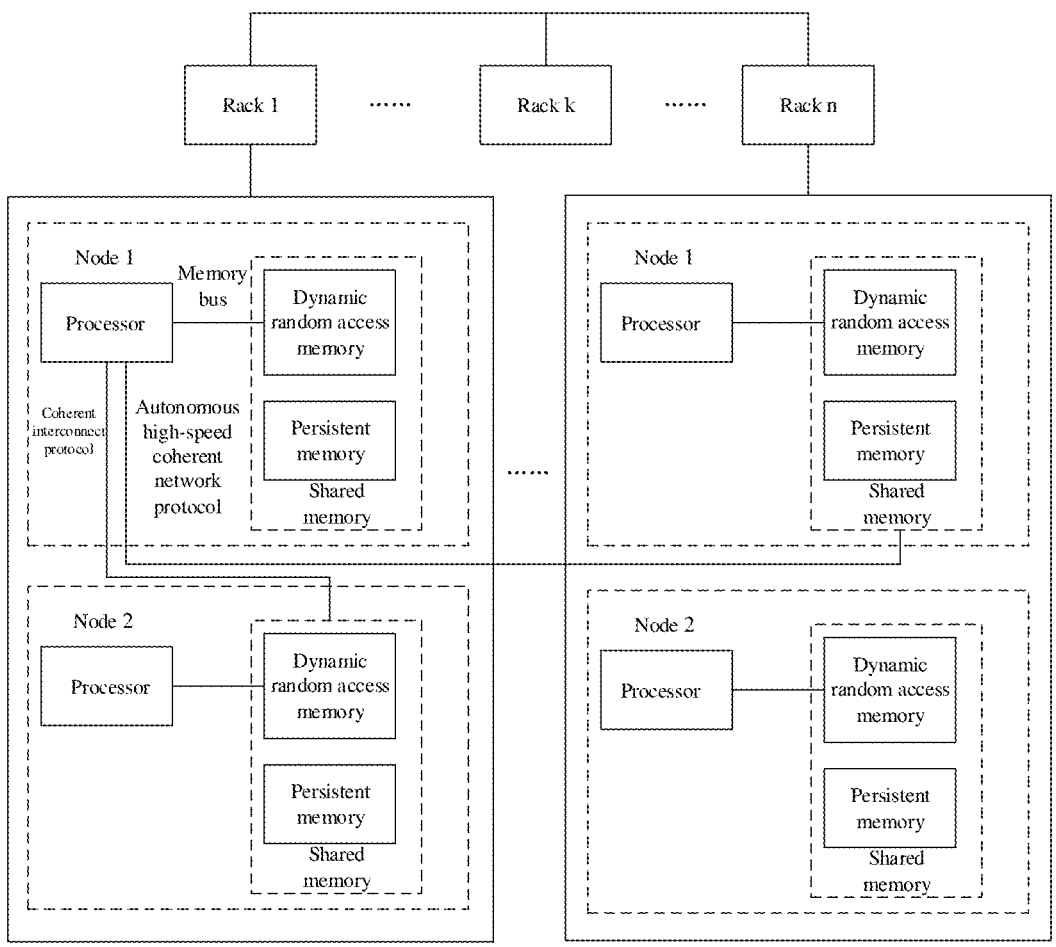
FIG. 4 is a schematic diagram of a structure of a memory page management system according to an embodiment of this disclosure.

Referring to FIG. 4, FIG. 4 is a schematic diagram of a structure of a memory page management system according to an embodiment of this disclosure, illustrating n racks.

The memory page management system according to this embodiment of this disclosure may include at least two racks. Each rack includes at least two target nodes. Each target node includes a target processor and a memory, where the target processor of the target node is connected with the memory of at least one other target node located on the same rack and the memory of at least one target node located on different racks.

The target processor is configured to acquire a target virtual address of data to be accessed; perform a physical address lookup in a translation lookaside buffer based on the target virtual address, where the translation lookaside buffer stores mapping relationships between target physical addresses in a local memory and other memories and corresponding virtual addresses; read target data to be accessed from a physical address to be accessed if the physical address to be accessed, corresponding to the target virtual address, is found in the translation lookaside buffer; and perform a parallel physical address lookup in a local memory page table and other memory page tables based on the target virtual address if the physical address to be accessed is not found in the translation lookaside buffer, and read the target data to be accessed from the physical address to be assessed if the physical address to be accessed is found, where the local memory page table includes page tables that store mapping relationships between physical addresses in the local memory and corresponding virtual addresses; the other memory page tables include page tables that store mapping relationships between physical addresses in the other memories and corresponding virtual addresses; and the local memory includes a memory connected with the target processor in the target node, while the other memories include memories connected with the target processor in other nodes except the target node.

For a corresponding description of the memory page management system according to this embodiment of this disclosure, reference may be made to the above embodiments, which will not repeated herein.

Figure 5:
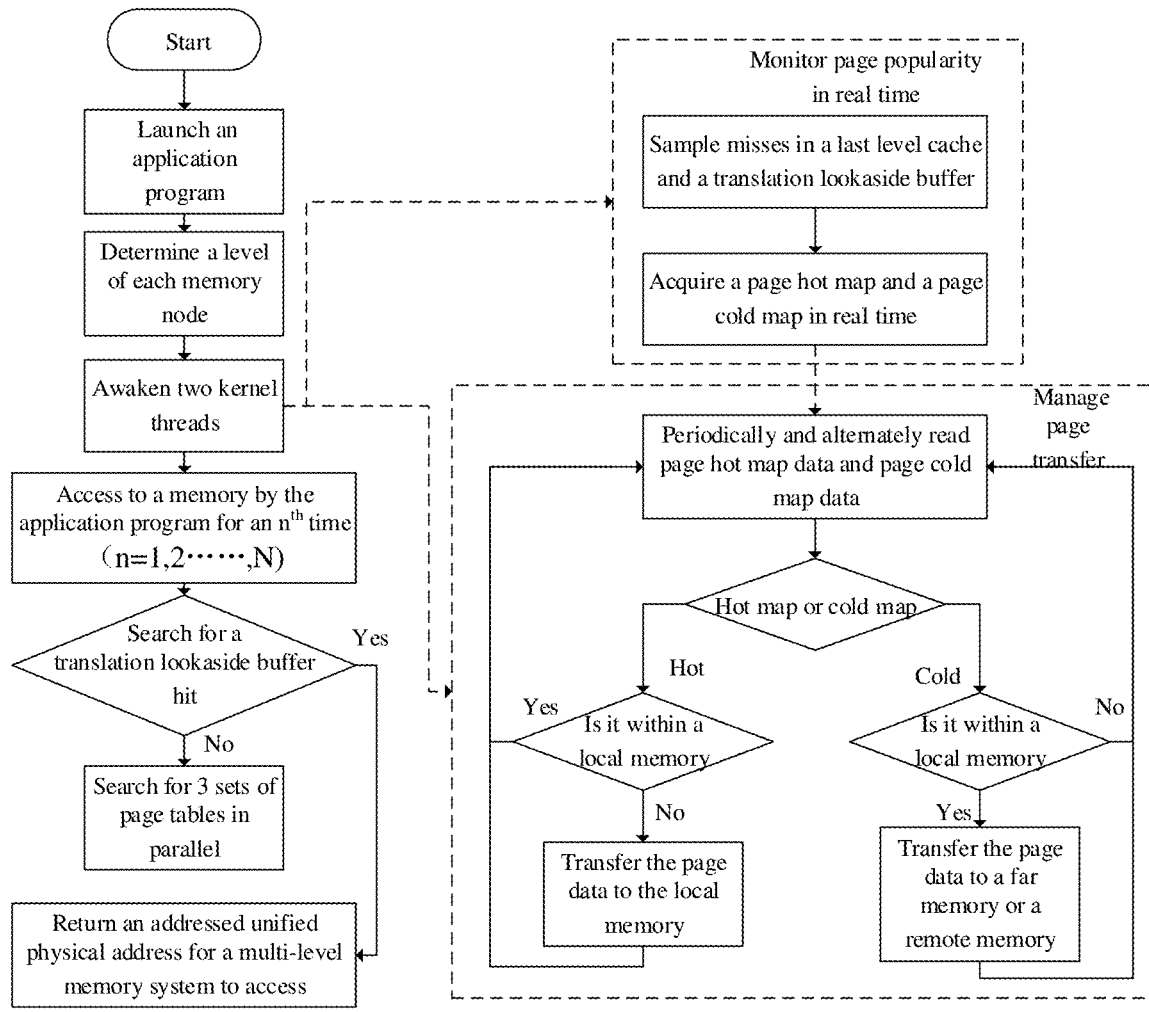
FIG. 5 is a schematic diagram of a memory page management method according to an embodiment of this disclosure in an application scenario.

Referring to FIG. 5, to facilitate the understanding of the solutions of the embodiments of this disclosure, the memory page management solution in this embodiment of this disclosure is described in conjunction with an application program. The process includes the following steps:

the application program is launched;

a level of each memory node is determined, such as determining a memory in a node 1 in a rack 1 as a local memory, determining a memory in a node 2 in the rack 1 as a far memory, and determining a memory in a node 1 in a rack n as a remote memory;

two kernel threads are awakend, where the first kernel thread is used for real-time page popularity monitoring, such as using a precise event-based sampling (PEBS) mechanism to sample misses in a last level cache and a translation lookaside buffer, thereby acquiring recent operation information in a virtual address space to generate a page usage cold/hot map; and the second kernel thread periodically and alternately reads page hot map data and cold map data, if a hot map is read and is not within the local memory, page data corresponding to the hot map is moved to the local memory, if the hot map is within the local map, no movement is performed, if a cold map is read and is within the local memory, page data corresponding to the cold map is moved to the far memory or the remote memory, and if the cold map is not within the local memory, no movement is performed;

the memory is accessed by the application program for an $n^{th}$ time; and it is determined whether a translation lookaside buffer hit is found, in the case of determining that the translation lookaside buffer hit is found, returning an addressed unified physical address for a multi-level memory system to access, and in the case of determining that no translation lookaside buffer hit is found, performing a parallel search for page tables of the local memory, page tables of the far memory, and page tables of the remote memory, and returning the addressed unified physical address for the multi-level memory system to access.

Figure 6:
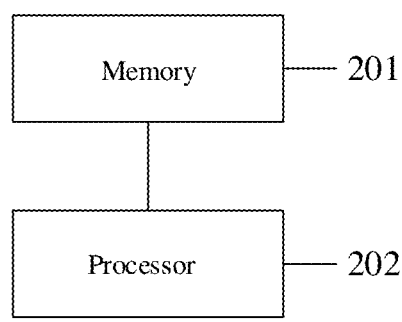
FIG. 6 is a schematic diagram of a structure of an electronic device according to an embodiment of this disclosure.

Embodiments of this disclosure further provide an electronic device and a computer non-volatile readable storage medium, which both have corresponding effects of the memory page management method provided by the embodiments of this disclosure. Referring to FIG. 6, FIG. 6 is a schematic diagram of a structure of an electronic device according to an embodiment of this disclosure.

The electronic device according to this embodiment of this disclosure includes a memory 201 and a processor 202. The memory 201 has a computer program stored therein. The processor 202, when executing the computer program, implements the steps of the memory page management method described in any one of the above embodiments.

Figure 7:
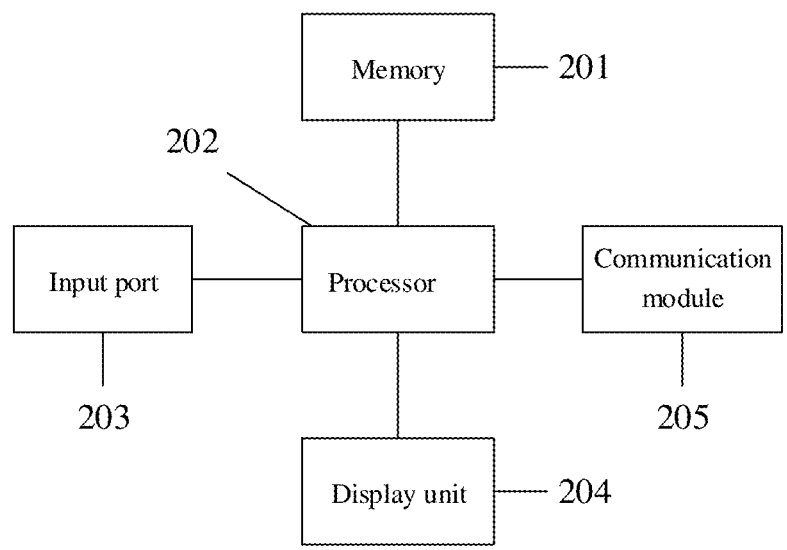
FIG. 7 is a schematic diagram of another structure of an electronic device according to an embodiment of this disclosure.

Referring to FIG. 7, another electronic device according to an embodiment of this disclosure may further include: an input port 203 connected with the processor 202 and configured to transmit commands input from an outside to the processor 202; a display unit 204 connected with the processor 202 and configured to display a processing result of the processor 202 to the outside; and a communication module 205 connected with the processor 202 and configured to realize communication between the electronic device and the outside. The display unit 204 may be a display panel, a laser scanning type display, etc. A communication mode adopted by the communication module 205 includes, but is not limited to, a mobile high-definition link (MHL) technology, a universal serial bus (USB), a high definition multimedia interface (HDMI), and a wireless connection: a wireless fidelity (WiFi) technology, a bluetooth communication technology, a low-power-consumption bluetooth communication technology, and an IEEE802.11s-based communication technology.

A computer non-volatile readable storage medium according to an embodiment of this disclosure has a computer program stored therein. The computer program, when executed by a processor, implements the steps of the memory page management method described in any one of the above embodiments.

The computer non-volatile readable storage medium involved in this embodiment of this disclosure includes a random access memory (RAM), a memory, a read-only memory (ROM), an electrically programmable ROM, an electrically erasable programmable ROM, a register, a hard disk, a removable disk, a CD-ROM, or any other form of storage medium known in the technical field.

For descriptions of related parts in the memory page management system and apparatus, the electronic device, and the computer non-volatile readable storage medium provided in the embodiments of this disclosure, reference is made to detailed descriptions of corresponding parts in the memory page management method provided in this embodiment of this disclosure, which will not be repeated herein. Additionally, parts in the above technical solutions provided in the embodiments of this disclosure that are consistent with the corresponding technical solutions in the prior art in implementation principle are not described in detail, so as to avoid excessive repetition.

It should also be noted that herein, relational terms such as first and second are only used to distinguish one entity or operation from another entity or operation, and do not necessarily require or imply that such an actual relationship or order exists between these entities or operations. In addition, the terms "comprise", "include", or any other variations thereof are intended to cover non-exclusive inclusions, and therefore a process, a method, an article, or a device including a series of elements not only includes those elements but also includes other elements not clearly listed, or further includes elements inherent to the process, the method, the article, or the device. In the absence of more restrictions, an element defined by the phrase "including a . . . " does not exclude an additional identical element in the process, the method, the article, or the device that includes the element.

Those skill in the art can implement or use the embodiments of this disclosure according to the above descriptions of the disclosed embodiments. More modifications for these embodiments are apparent to those skilled in the art, and general principles defined herein may be implemented in other embodiments without departing from the spirit or scope of the embodiments of this disclosure. Therefore, the embodiments of this disclosure will not be limited to these embodiments shown herein but needs to conform to the widest scope consistent to the principles and novel characteristics disclosed herein.

What is claimed is:

1. A memory page management method, applied to a target processor in a target node, comprising:
   acquiring a target virtual address of data to be accessed;
   performing a physical address lookup in a translation lookaside buffer based on the target virtual address, the translation lookaside buffer storing mapping relationships between target physical addresses in a local memory and other memories and corresponding virtual addresses, wherein the target physical addresses comprise physical addresses of first popularity data, and popularity data comprises data satisfying hot access conditions;
   reading target data to be accessed from a physical address to be accessed if the physical address to be accessed, corresponding to the target virtual address, is found in the translation lookaside buffer; and
   performing a parallel physical address lookup in a local memory page table and other memory page tables based on the target virtual address if the physical address to be accessed is not found in the translation lookaside buffer, and reading the target data to be accessed from the physical address to be assessed if the physical address to be accessed is found,
   wherein the local memory page table comprises page tables that store mapping relationships between physical addresses in the local memory and corresponding virtual addresses; the other memory page tables comprise page tables that store mapping relationships between physical addresses in the other memories and corresponding virtual addresses; and the local memory comprises a memory connected with the target processor in the target node, while the other memories comprise memories connected with the target processor in other nodes except the target node.

2. The method according to claim 1, further comprising:
   acquiring the local memory;
   acquiring the other memories; and
   uniformly addressing the local memory and the other memories to obtain physical addresses of the memories, in order to screen out the target physical addresses in the local memory and the other memories generating the translation lookaside buffer based on the target physical addresses and corresponding virtual addresses, generating the local memory page table based on other physical addresses in the local memory except the target physical addresses and corresponding virtual addresses, and generating the other memory page tables based on other physical addresses in the other memories except the target physical addresses and corresponding virtual addresses.

3. The method according to claim 2, further comprising:
   monitoring usage popularity on a last level cache, the translation lookaside buffer, the local memory page table, and the other memory page tables based on a first kernel thread, to obtain a page usage cold/hot map, cold pages in the page usage cold/hot map storing mapping relationships between virtual addresses and physical addresses with the usage popularity lower than a set value, and hot pages in the page usage cold/hot map storing mapping relationships between virtual addresses and physical addresses with the usage popularity higher than the set value; and transferring, according to the page usage cold/hot map, data corresponding to the cold pages from the local memory to the other memories based on a second kernel thread, transferring data corresponding to the hot pages from the other memories to the local memory based on the second kernel thread, and updating the mapping relationships in the translation lookaside buffer, the local memory page table, and the other memory page tables, wherein the last level cache stores second popularity data with the popularity higher than that of the first popularity data.

4. The method according to claim 3, wherein the local memory and the other memories are all composed of a dynamic random access memory and a persistent memory.

5. The method according to claim 4, wherein transferring data corresponding to the cold pages from the local memory to the other memories based on the second kernel thread comprises:

transferring data corresponding to the cold pages from the local memory to the persistent memories in the other memories based on the second kernel thread in a case that the persistent memories in the other memories are not full; and transferring the data corresponding to the cold pages from the local memory to the dynamic random access memories in the other memories based on the second kernel thread in a case that the persistent memories in the other memories are full.

6. The method according to claim 4, wherein transferring data corresponding to the hot pages from the other memories to the local memory based on the second kernel thread comprises:

transferring the data corresponding to the hot pages from the other memories to the dynamic random access memory in the local memory based on the second kernel thread in a case that the dynamic random access memory in the local memory is not full; and transferring the data corresponding to the hot pages from the other memories to the persistent memory in the local memory based on the second kernel thread in a case that the dynamic random access memory in the local memory is full.

7. The method according to claim 3, wherein before performing the physical address lookup in a translation lookaside buffer based on the target virtual address, the method further comprises:

performing a data lookup in the last level cache based on the target virtual address;

ending the lookup in a case that the target data is found in the last level cache; and performing the step of performing a physical address lookup in a translation lookaside buffer based on the target virtual address in a case that no target data is found in the last level cache.

8. The method according to claim 3, wherein uniformly addressing the local memory and the other memories comprises:

performing uniform addressing on the local memory and the other memories using rack base addresses, node base addresses, and node internal hardware addresses, the rack base addresses comprising base addresses of racks where nodes are located.

9. The method according to claim 3, wherein the other memories comprise first-level memories and second-level memories, and the distance between the first-level memories and the target processor is smaller than the distance between the second-level memories and the target processor.

10. The method according to claim 9, wherein the target processor and the local memory are connected through a memory bus.

11. The method according to claim 9, wherein the target processor and the first-level memories are connected through a coherent interconnect protocol.

12. The method according to claim 9, wherein the target processor and the second-level memories are connected through an autonomous high-speed coherent network protocol.

13. The method according to claim 9, wherein the first-level memories comprise memories in the other nodes located on the same rack as the target node.

14. The method according to claim 13, wherein the first-level memories comprise at least two memories.

15. The method according to claim 9, wherein the second-level memories comprise memories in the other nodes on different racks from the target node.

16. The method according to claim 15, wherein the second-level memories comprise memories in at least two of the other nodes on the same rack.

17. The method according to claim 15, wherein the second-level memories comprise memories in at least two of the other nodes on different racks.

18. The method according to claim 9, wherein transferring data corresponding to the cold pages from the local memory to the other memories based on the second kernel thread comprises:

transferring the data corresponding to the cold pages from the local memory to the first-level memories based on the second kernel thread in a case that the first-level memories are not full; and transferring the data corresponding to the cold pages from the local memory to the second-level memories based on the second kernel thread in a case that the first-level memories are full.

19. A memory page management system, comprising at least two racks, each rack comprising at least two target nodes, each target node comprising a target processor and a memory, the target processor of the target node being connected with the memory of at least one other target node located on the same rack and the memory of at least one target node located on different racks, wherein the target processor is configured to acquire a target virtual address of data to be accessed; perform a physical address lookup in a translation lookaside buffer based on the target virtual address, the translation lookaside buffer storing mapping relationships between target physical addresses in a local memory and other memories and corresponding virtual addresses, wherein the target physical addresses comprise physical addresses of first popularity data, and popularity data comprises data satisfying hot access conditions; read target data to be accessed from a physical address to be accessed in a case that the physical address to be accessed, corresponding to the target virtual address, is found in the translation lookaside buffer; and perform a parallel physical address lookup in a local memory page table and other memory page tables based on the target virtual address in a case that the physical address to be accessed is not found in the translation lookaside buffer, and read the target data to be accessed from the physical address to be assessed in a case that the physical address to be accessed is found, the local memory page table comprising page tables that store mapping relationships between physical addresses in the local memory and corresponding virtual addresses, the other memory page tables comprising page tables that store mapping relationships between physical addresses in the other memories and corresponding virtual addresses, and the local memory comprising a memory connected with the target processor in the target node, while the other memories comprising memories connected with the target processor in other nodes except the target node.

20. An electronic device, comprising:

a memory, configured to store a computer program; and a processor, configured to implement, when executing the computer program, the computer program instructions implement to:

acquire a target virtual address of data to be accessed;

perform a physical address lookup in a translation lookaside buffer based on the target virtual address, the translation lookaside buffer storing mapping relationships between target physical addresses in a local memory and other memories and corresponding virtual addresses, wherein the target physical addresses comprise physical addresses of first popularity data, and popularity data comprises data satisfying hot access conditions;

read target data to be accessed from a physical address to be accessed in a case that the physical address to be accessed, corresponding to the target virtual address, is found in the translation lookaside buffer; and perform a parallel physical address lookup in a local memory page table and other memory page tables based on the target virtual address in a case that the physical address to be accessed is not found in the translation lookaside buffer, and reading the target data to be accessed from the physical address to be assessed in a case that the physical address to be accessed is found, wherein the local memory page table comprises page tables that store mapping relationships between physical addresses in the local memory and corresponding virtual addresses; the other memory page tables comprise page tables that store mapping relationships between physical addresses in the other memories and corresponding virtual addresses; and the local memory comprises a memory connected with the target processor in the target node, while the other memories comprise memories connected with the target processor in other nodes except the target node.

* * * * *